United States Patent
Kuo

(10) Patent No.: US 11,732,134 B2
(45) Date of Patent: Aug. 22, 2023

(54) BENZOCYCLOBUTENE-CONTAINING POLYIMIDE RESIN AND ITS COMPOSITION, MANUFACTURING METHOD, REDISTRIBUTION LAYER, POLYIMIDE FILM, AND USE

(71) Applicant: CHIN YEE CHEMICAL INDUSTRIES CO., LTD., Taipei (TW)

(72) Inventor: Pi-Tao Kuo, Taipei (TW)

(73) Assignee: CHIN YEE CHEMICAL INDUSTRIES CO., LTD., Taipei (TW)

( * ) Notice: Subject to any disclaimer, the term of this patent is extended or adjusted under 35 U.S.C. 154(b) by 266 days.

(21) Appl. No.: 17/242,212

(22) Filed: Apr. 27, 2021

(65) Prior Publication Data

US 2021/0261777 A1 Aug. 26, 2021

(30) Foreign Application Priority Data

Mar. 10, 2021 (TW) .................................. 110108554

(51) Int. Cl.
| | | |
|---|---|---|
| C08L 79/08 | (2006.01) | |
| C08G 85/00 | (2006.01) | |
| C08G 73/10 | (2006.01) | |
| C08K 7/28 | (2006.01) | |
| C08L 27/18 | (2006.01) | |

(52) U.S. Cl.
CPC ............ *C08L 79/08* (2013.01); *C08G 85/004* (2013.01); *C08L 2203/16* (2013.01); *C08L 2203/20* (2013.01)

(58) Field of Classification Search
None
See application file for complete search history.

(56) References Cited

U.S. PATENT DOCUMENTS

| | | | |
|---|---|---|---|
| 4,711,964 A * | 12/1987 | Tan ...................... | C07D 209/48 548/545 |
| 5,449,740 A | 9/1995 | Tan et al. | |
| 5,464,925 A | 11/1995 | Moyer et al. | |

FOREIGN PATENT DOCUMENTS

| | | |
|---|---|---|
| CN | 105585671 A * | 5/2016 |
| CN | 108503647 | 9/2018 |
| JP | H02639 | 1/1990 |
| JP | H03502110 | 5/1991 |
| JP | H11504369 | 4/1999 |
| JP | 2018168371 | 11/2018 |
| TW | 201233713 | 8/2012 |
| TW | 201433591 | 9/2014 |

OTHER PUBLICATIONS

Takeichi et al., "Readily Processable Imide Oligomers Containing Perfluoroisopropylidene Connecting Units and Reactive Acetylenic and Biphenylene Groups: Synthesis, Curing and Thermal Properties," Macromolecules, vol. 19, pp. 2108-2114 (1986). (Year: 1986).*
Denny et al., "Characterization of Bisbenzocyclobutene High-Temperature Resin and Bisbenzocyclobutene Blended with a Compatible Bismaleimide Resin," Crosslinked-Polymers, Chapter 25, ACS Symposium Series, vol. 367; American Chemical Society: Washington DC, pp. 366-378, (1988) (Year: 1988).*
"Office Action of Taiwan Counterpart Application", dated Sep. 2, 2021, p1-p3.
Vainer, A. et al., "Synthesis, thermo- and photochemical transformations of fluorine-containing polyimide derivatives with pendant benzocyclo butene groups", Treasures of the Academy of Sciences, vol. 360, No. 6, Jan. 1998, with English translation thereof, pp. 1-10.
"Notice of allowance of Japan Counterpart Application", dated Jul. 12, 2022, p1-p2.

* cited by examiner

*Primary Examiner* — Randy P Gulakowski
*Assistant Examiner* — Ha S Nguyen
(74) *Attorney, Agent, or Firm* — JCIPRNET

(57) ABSTRACT

A benzocyclobutene-containing polyimide resin and a benzocyclobutene-containing polyimide resin composition are provided. The composition includes: (a) a filler: hollow silica, a perfluoroalkoxy alkane resin, or a combination thereof, and (b) a benzocyclobutene-containing polyimide resin with characteristics of high heat resistance, low dielectric property, low elastic modulus, and suitable for manufacturing a redistribution layer and a polyamide film of a semiconductor packaging material in a high-speed and high-frequency field.

15 Claims, No Drawings

BENZOCYCLOBUTENE-CONTAINING POLYIMIDE RESIN AND ITS COMPOSITION, MANUFACTURING METHOD, REDISTRIBUTION LAYER, POLYIMIDE FILM, AND USE

CROSS-REFERENCE TO RELATED APPLICATION

This application claims the priority benefit of Taiwan application serial no. 110108554, filed on Mar. 10, 2021. The entirety of the above-mentioned patent application is hereby incorporated by reference herein and made a part of this specification.

BACKGROUND

Technical Field

The disclosure relates to a benzocyclobutene-containing polyimide resin and a benzocyclobutene-containing polyimide resin composition, including: (a) a filler: hollow silica, a perfluoroalkoxy alkane resin, or a combination thereof, and (b) a benzocyclobutene-containing polyimide resin with characteristics of high heat resistance, low dielectric property, low elastic modulus, and suitable for manufacturing a redistribution layer and a polyamide film of a semiconductor packaging material in a high-speed and high-frequency field.

Description of Related Art

According to Moore's Law, the rule of thumb in the semiconductor industry, the number of components that may be accommodated in an integrated circuit doubles every 1.5 years. However, this growth rate has slowed since 2013, and semiconductor manufacturing costs and risks have gradually increased. How to continue and surpass Moore's Law is a difficult issue for the industry.

FOWLP (Fan Out Wafer Level Package) has a history of more than 10 years. The technology is becoming mature, and it is often a hot topic. The technology was originally developed by Germany Infineon Technologies. In 2017, based on the FOWLP technology, TSMC continued to develop and manufacture the A10 processor required for Apple iPhone 7/7 Plus.

In recent years, with the continuous expansion of the FOWLP market, FOWLP has become the mainstream technology for semiconductor packaging. FOWLP is a package formed by connecting the necessary circuit from a terminal lead of a bare die to a redistribution layer. Not only the wiring and bump, but also an IC carrier board is not required. Therefore, the manufacturing cost may be reduced by 30%, and the thickness of the chip may be reduced.

In FOWLP, the chip reduces the circuit length due to the redistribution layer, which significantly improves the signal transmission loss. Compared with FCiP (Flip Chip in Package), the semiconductor chip area and packaging area of FOWLP is much smaller, so that the complex process may be greatly reduced, and the use of materials may also be reduced. With such packaging manufacturing technology, localized production may be achieved and costs may be effectively reduced. In brief, FOWLP is a homogeneous or heterogeneous integration technology that integrates multiple chip sets with the same or different functions through co-package. The chips are connected to each other by the redistribution layer to form a package.

The redistribution layer is to change the contact position (I/O pad) of the originally designed IC circuit through a wafer-level metal wiring process and a pad process. Thereby a metal circuit is redistributed. Therefore, the redistribution layer may be applied to various component modules. That is to say, the main purpose of the RDL (redistribution layer) is to rebuild the I/O distribution to meet the requirement of reducing the package size.

Recently, with high speed and miniaturization, an issue of circuit delay has been highlighted. Due to the miniaturization of a communication device, a transistor accelerates the size reduction. In terms of the circuit, although the circuit length may be shortened to reduce the delay effect, the effect occurs due to the narrowing of the line width and line pitch, and the circuit delay (RC delay). The RC delay is determined by a circuit parasitic resistance R and a parasitic capacitance C. The parasitic capacitance C decreases as a dielectric constant of an insulating material in the redistribution layer of the separated circuit decreases. Therefore, the RC delay may be effectively reduced by using a material with the low dielectric constant as the material of the redistribution layer.

Communication technology has moved from 5G to 6G. From the demand for high-density, miniaturized, and high-speed and large-capacity semiconductor packaging, semiconductors are also developing towards 2.5 D, 3D and FOWLP packaging. Semiconductor packaging materials will directly face new issues and new challenges, and a polymer insulating material of the redistribution layer needs to have characteristics of high heat resistance, low elastic modulus, low dielectric constant, and low dielectric loss.

A polyimide resin, which is often used as the insulating material of the redistribution layer, requires a heat curing temperature of 300° C. or higher after pattern formation. From the viewpoint of heat resistance of a semiconductor component, the resin that may be heat-cured at a lower temperature is necessary. However, in FOWLP, a substrate may warp due to the stress generated by thermal shock. In order to suppress warpage, the low elastic modulus of the insulating material cannot be ignored.

Citation 1 discloses a polyimide resin. With phthalic dianhydride and dimer diamine having the carbon number of 36 (abbreviated as C36DA), a solvent-soluble polyimide resin is synthesized under a reaction and dehydration in a solvent of sxylene and dimethylacetamide. With a biphenyl novolac epoxy resin as a curing agent, a cured product is used for a flexible substrate and a semiconductor packaging material, and the Df (1 GHz) thereof is above 0.0031.

Citation 2 discloses a polyimide and a manufacturing method thereof. With aromatic anhydride and dimer diamine having the carbon number of 36 (abbreviated as C36DA), a solvent-soluble polyimide resin is synthesized. With a tetrafunctional epoxy resin as a crosslinking agent, a cured product is used for an adhesive layer of a flexible wiring board, and the Df thereof (10 GHz) is above 0.0026.

Citations 1 and 2 use polyimide of C36DA diamine. After curing, the glass transition temperature (DMA method) is about 50° C. or less. The heat resistance is insufficient, so that it cannot be applied to a redistribution layer and a film for semiconductor packaging in the high-speed and high-frequency field. Therefore, how to improve the characteristics of the resin such as low dielectric property, high heat resistance, and low elastic modulus is an important issue that the industry is urgently seeking a solution.

Citation 1: TW 201433591A
Citation 2: JP 2018-168371A

SUMMARY

In the related art, a glass transition temperature of a polyimide resin is too low. The issue to be solved by the disclosure is how to acquire low dielectric property, high heat resistance, low elastic modulus, and low temperature processability to meet requirements of an application of a redistribution layer and a thin film for semiconductor packaging in the high-speed and high-frequency field.

In view of the above issue, a technical means of the disclosure to solve the issue is to design a polyimide terminated with a benzocyclobutene group through a molecular design, to increase the glass transition temperature (Tg) with a rigid structure segment of biphenyl and fluorene, to introduce a aliphatic flexible long-chain segment into the molecule so as to reduce the dielectric property and maintain low elastic modulus, and to introduce a fluorine-containing aromatic segment, a fluorene segment, and a aliphatic long-chain so as to increase solvent solubility.

A terminal of a polyimide molecule is terminated with a benzocyclobutene group with excellent thermal stability, which gives the polyimide molecule the self-crosslinking property and prevents a terminal segment of the molecule from moving under an electric field. Therefore, not only the dielectric property may be reduced, and the heat resistance may be enhanced, but also the solvent resistance may be improved. The benzocyclobutene group may form a three-dimensional network structure after thermal ring opening. A catalyst is not required in the process of ring opening, and no by-products and water are produced, so that the dielectric property is not easily affected.

The disclosure discloses a benzocyclobutene-containing polyimide resin, which has a chemical structure represented by Formula (1).

P is a C36 divalent hydrocarbon group having an aliphatic side chain;

A is

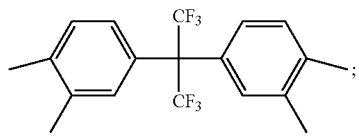

Y is one or more selected from a group consisting of

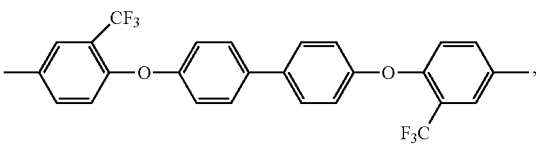

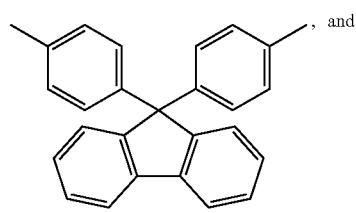

, and

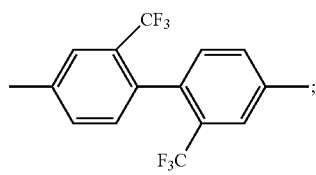

n is an integer selected from 1 to 5000, and m is an integer selected from 1 to 5000.

The disclosure discloses a benzocyclobutene-containing polyimide resin composition, which includes at least: (a) a filler, including hollow silica, a perfluoroalkoxy alkane resin, or a combination thereof, and (b) a benzocyclobutene-containing polyimide resin, which has a chemical structure represented by Formula (1).

Formula (1)

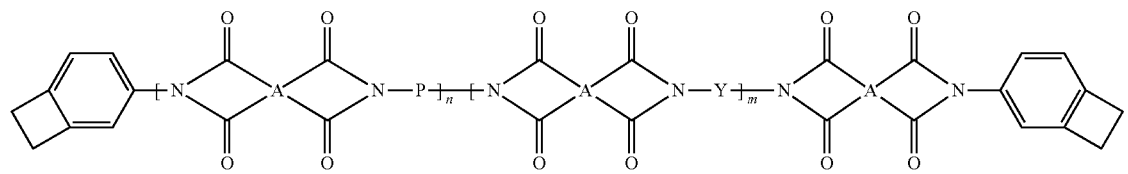

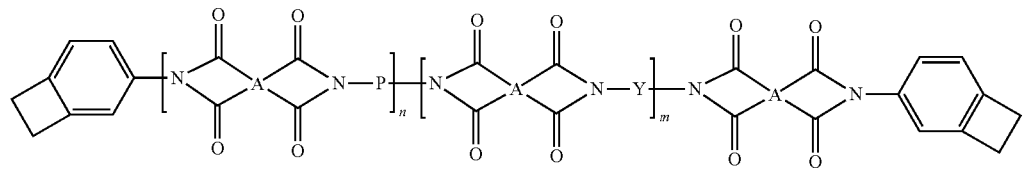

Formula (1)

P is a C36 divalent hydrocarbon group having an aliphatic side chain;

A is

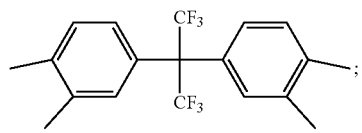

Y is

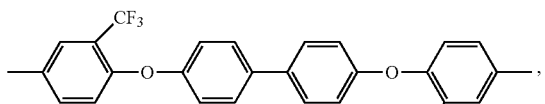

, or

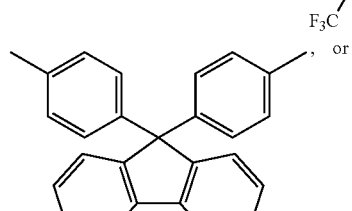

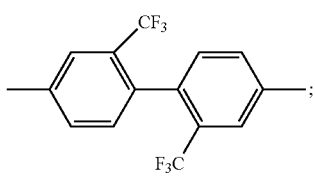

n is an integer selected from 1 to 5000, and m is an integer selected from 1 to 5000.

The disclosure discloses a manufacturing method of a benzocyclobutene-containing polyimide resin, which has a chemical structure represented by Formula (1).

P is a C36 divalent hydrocarbon group having an aliphatic side chain;

A is

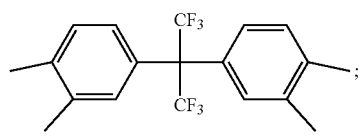

Y is one or more selected form a group consisting of

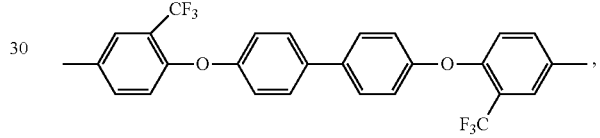

, and

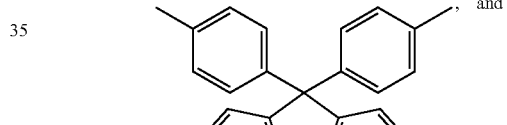

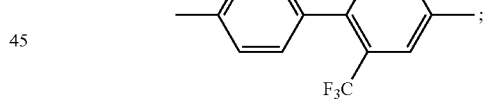

n is an integer selected from 1 to 5000, and m is an integer selected from: 1 to 5000.

The manufacturing method of the benzocyclobutene-containing polyimide resin includes the following procedures.

In a procedure A, a dehydration reaction is performed on C36 dimer diamine, aromatic diamine, and aromatic dianhydride in a mixed solvent of a polar solvent and a low polar

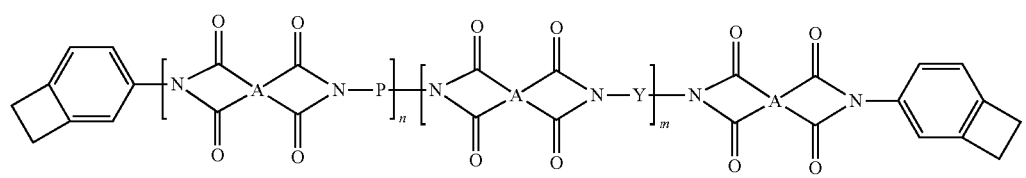

Formula (1)

solvent to obtain a first solution containing a polyimide resin having an amine group at a terminal;

in a procedure B, 4-aminobenzocyclobutene is added to the first solution, so that the dehydration reaction is performed on 4-aminobenzocyclobutene and the polyimide resin having the amine group at the terminal to obtain a second solution containing a polyimide resin having benzocyclobutene at a terminal, and in a procedure C, an unreacted substance, a water-soluble substance and water in the second solution are removed to obtain the polyimide resin having benzocyclobutene at the terminal.

The disclosure discloses a redistribution layer, which includes the benzocyclobutene-containing polyimide resin and the benzocyclobutene-containing polyimide resin composition as constituent elements of the redistribution layer. The disclosure discloses a polyimide film, which includes the benzocyclobutene-containing polyimide resin and the benzocyclobutene-containing polyimide resin composition as the constituent elements of the polyimide film. The disclosure discloses a use of the redistribution layer, which is used to manufacture a semiconductor package. The disclosure discloses a use of the polyimide film, which is used to manufacture a semiconductor package, a high-frequency substrate, or a printed circuit board.

In contrast to the effect of the related art, the disclosure uses plant-derived C36DA as a raw material. For the considerations of environmental protection, a low dielectric insulating material for the redistribution layer is designed to synthesize the benzocyclobutene-containing polyimide resin that is soluble in the low polar solvent such as toluene, xylene, mesitylene, etc., which has characteristics of low dielectric, high heat resistance, and low elastic modulus. Therefore, the characteristics of the benzocyclobutene-containing polyimide resin in the disclosure are better than those of the polyimide resin using C36DA diamine in citations 1 and 2 of the prior art. In addition, in order to further reduce the dielectric property, hollow silica, the perfluoroalkoxy alkane resin (PFA), or the combination thereof are used as the filler to be blended with the benzocyclobutene-containing polyimide resin and cured, which may reduce the dielectric property. The benzocyclobutene-containing polyimide resin and the composition thereof are suitable for the packaging material, high-frequency substrate, and printed circuit board, etc. in the high-speed and high-frequency field.

DETAILED DESCRIPTION OF DISCLOSED EMBODIMENTS

An embodiment of the disclosure discloses a benzocyclobutene-containing polyimide resin, which has a chemical structure represented by Formula (1).

P is a C36 divalent hydrocarbon group having an aliphatic side chain;

A is one or more selected from a group consisting of

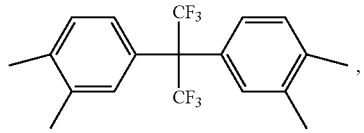

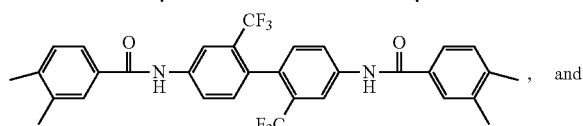, and

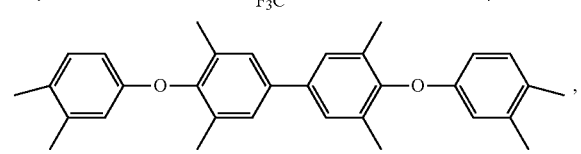, and preferably

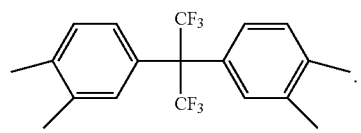.

Y is one or more selected from a group consisting of

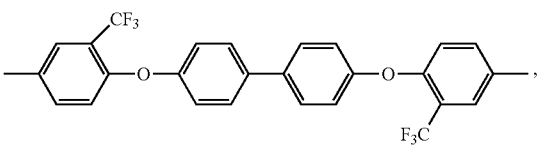,

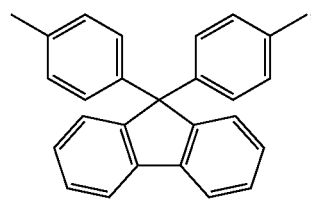,

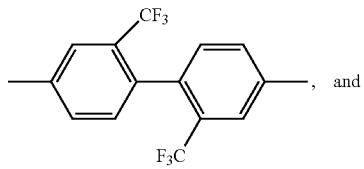, and

Formula (1)

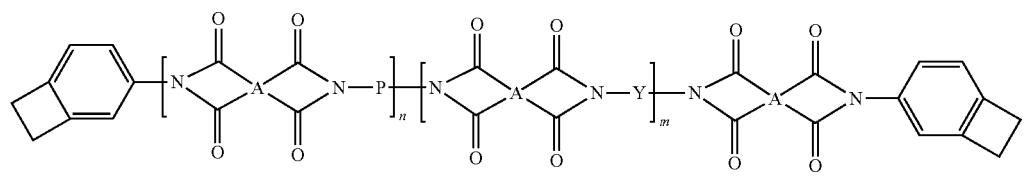

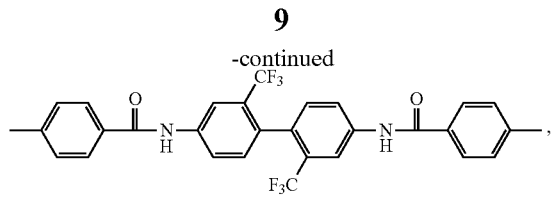

and preferably one or more selected from a group consisting of

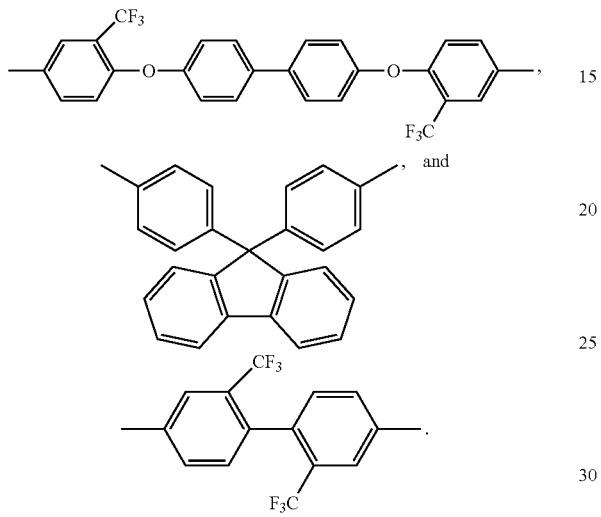

n is an integer selected from 1 to 5000, and m is an integer selected from 1 to 5000.

The disclosure discloses a benzocyclobutene-containing polyimide resin, which is obtained from a reaction of C36 divalent hydrocarbon diamine having an aliphatic side chain, aromatic diamine, fluorinated dianhydride, and 4-aminobenzocyclobutene. A C36 aliphatic segment in a molecule of the benzocyclobutene-containing polyimide resin may increase solubility of a solvent and reduce electromagnetism. C36 divalent hydrocarbon diamine having an aliphatic side chain is obtained by a reductive amination of dimer containing unsaturated C18 fatty acid, and a known structure of C36 divalent hydrocarbon diamine having an aliphatic side chain includes:

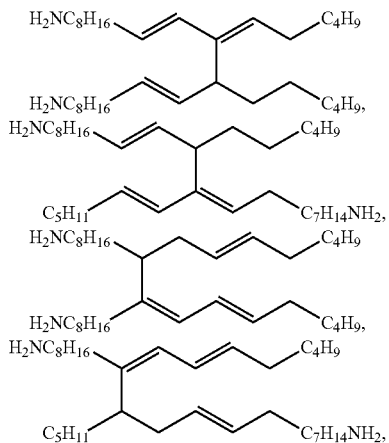

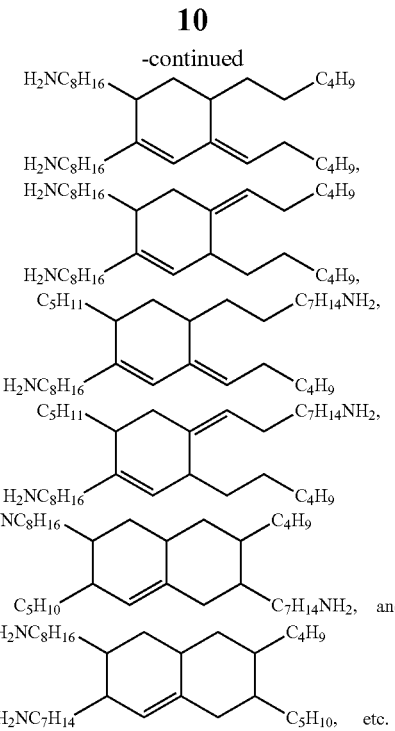

etc.

The disclosure discloses a benzocyclobutene-containing polyimide resin, and aromatic diamine used in a synthesis thereof may include:

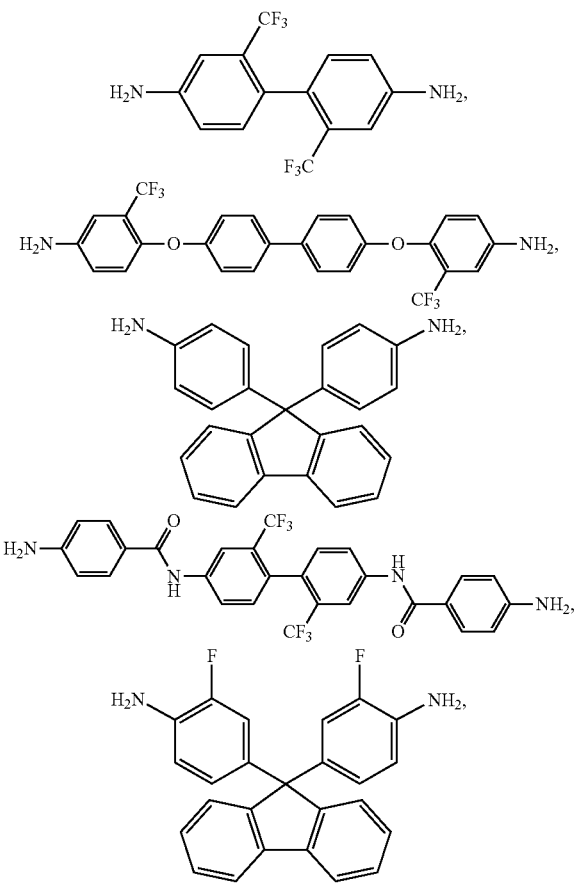

-continued

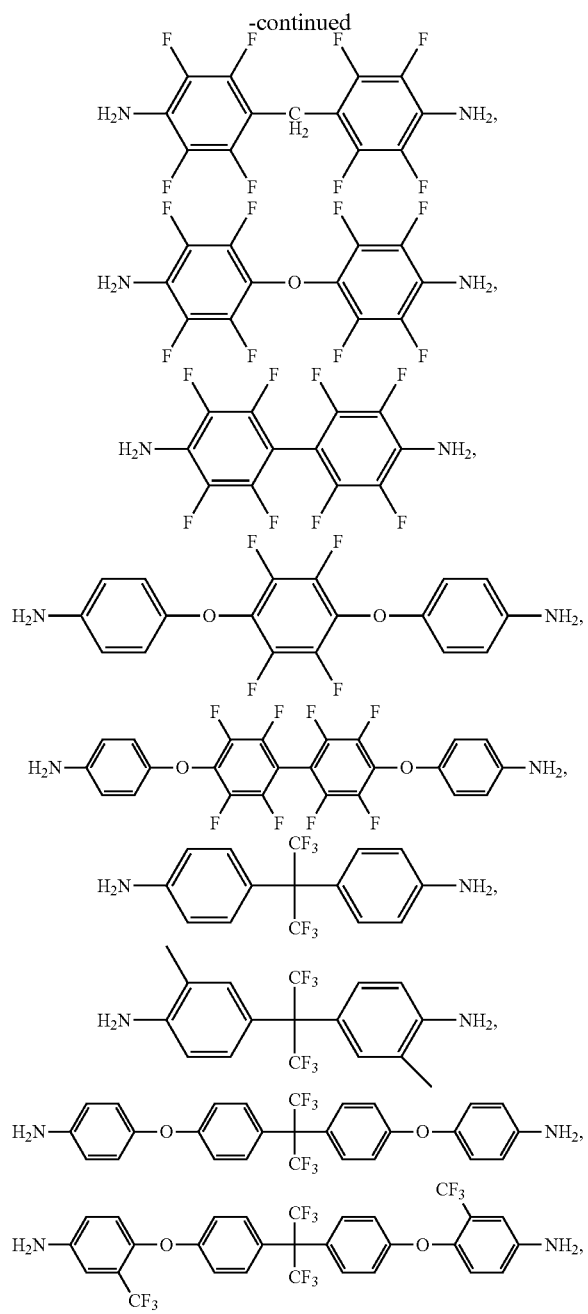

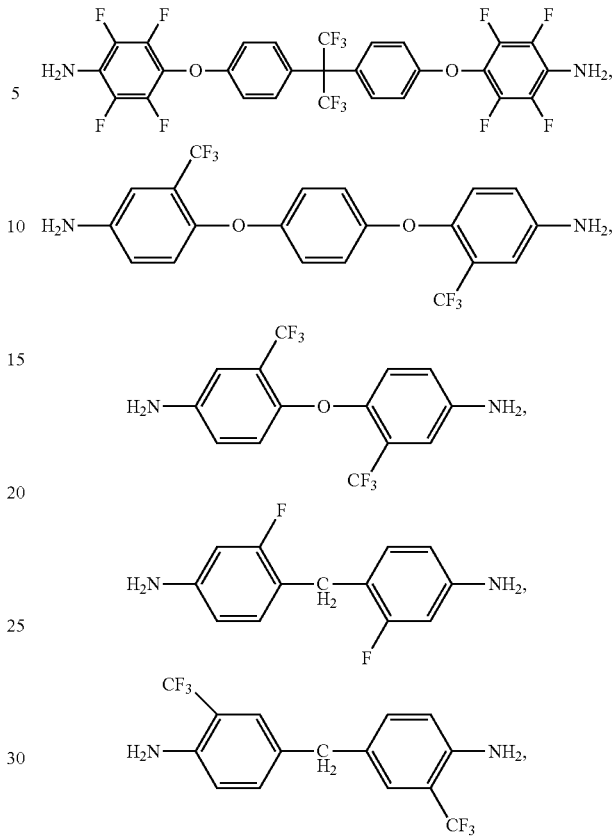

or a combination of the above compounds.

The disclosure discloses a benzocyclobutene-containing polyimide resin, which may open a ring at 200° C. to 250° C. to form o-quinodimethane with high activity. An unsaturated bond in the C36 aliphatic segment of o-quinodimethane and the benzocyclobutene-containing polyimide resin forms a six-membered carbocyclic ring with a Diels-Alder reaction. O-quinodimethane may also react with each other to form dimer or a high molecular weight o-xylene resin. A ring opening and polymerization reaction of benzocyclobutene is shown in the following.

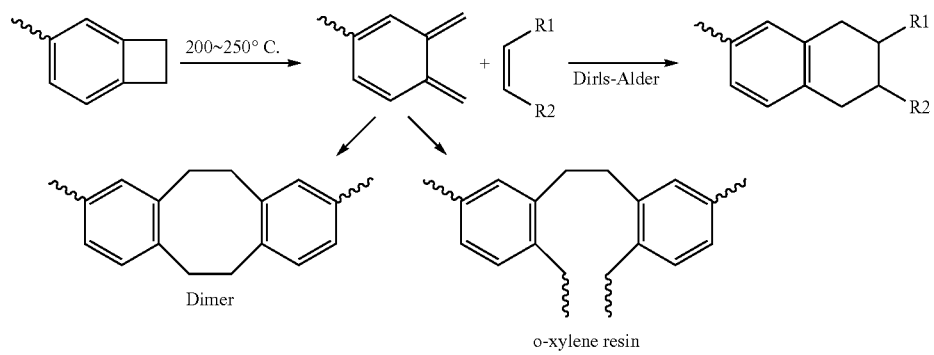

The disclosure provides a benzocyclobutene-containing polyimine resin, which is obtained by a reaction of C36 divalent hydrocarbon diamine having aliphatic side chain, aromatic dianhydride, aromatic diamine, and 4-aminobenzocyclobutene. A ratio between the molar number of aromatic dianhydride, the molar number of C36 divalent hydrocarbon diamine having an aliphatic side chain, and the molar number of aromatic diamine is 1.00:0.99 to 0.40; 0.00 to 0.59.

The disclosure provides a benzocyclobutene-containing polyimide resin. Specifically, in an embodiment, a reaction of a thermosetting polyimide resin is shown as follows:

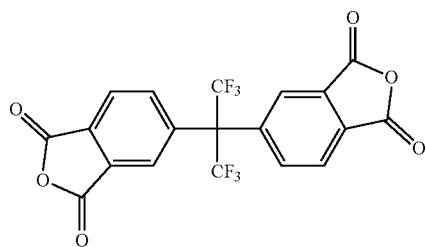
6F

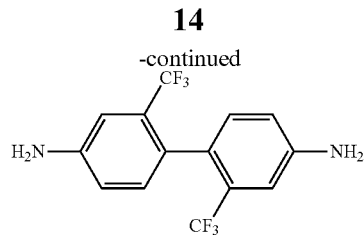
TF

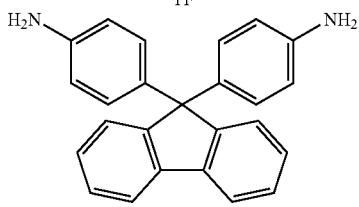
BF

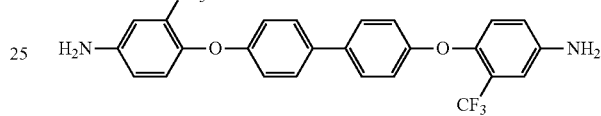
4ABC

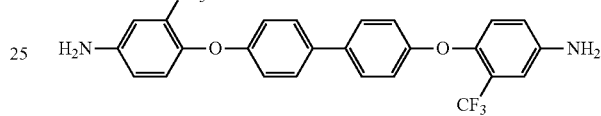
BP

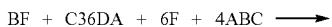
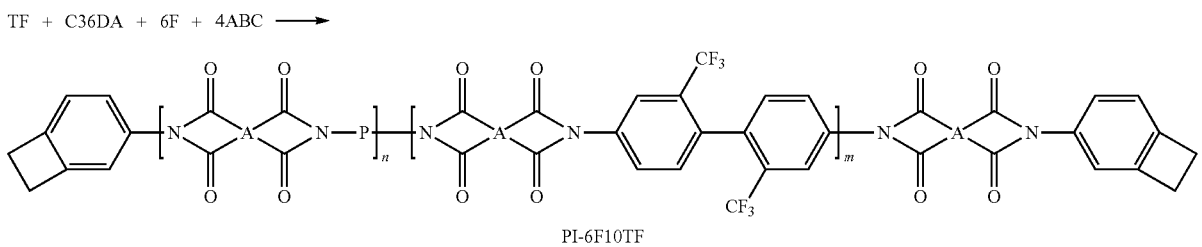
PI-6F10TF

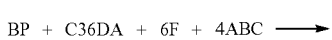
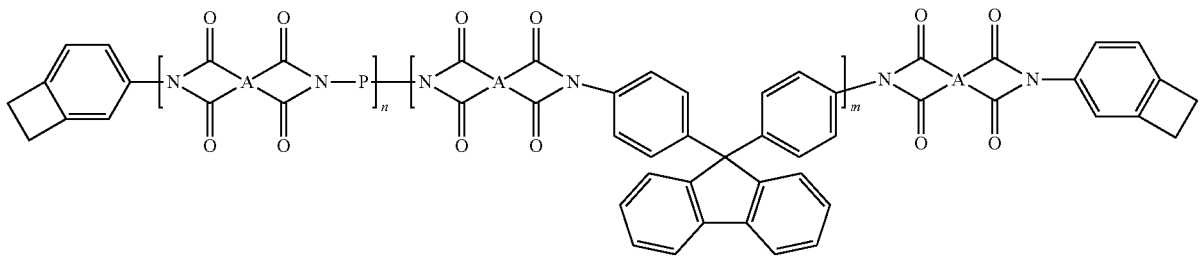
PI-6F10BF

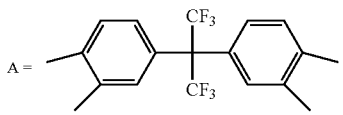
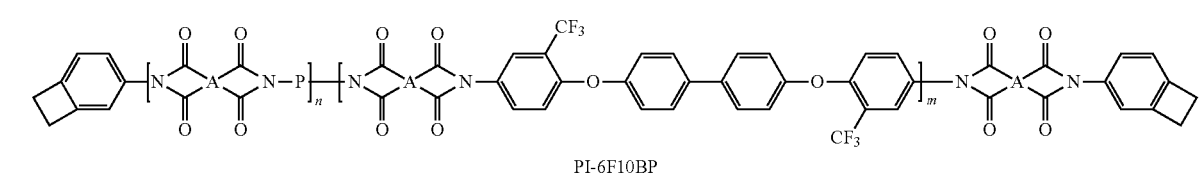
PI-6F10BP

P is a C36 divalent hydrocarbon group having an aliphatic side chain; n is an integer selected from 1 to 5000, and m is an integer selected from 1 to 5000.

The disclosure provides a manufacturing method of a benzocyclobutene-containing polyimide resin, which has a chemical structure represented by Formula (1).

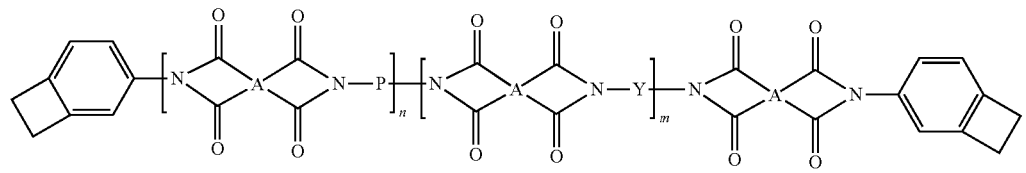

Formula (1)

P is a C36 divalent hydrocarbon group having an aliphatic side chain;

A is

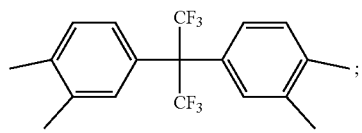

Y is one or more selected form a group consisting of

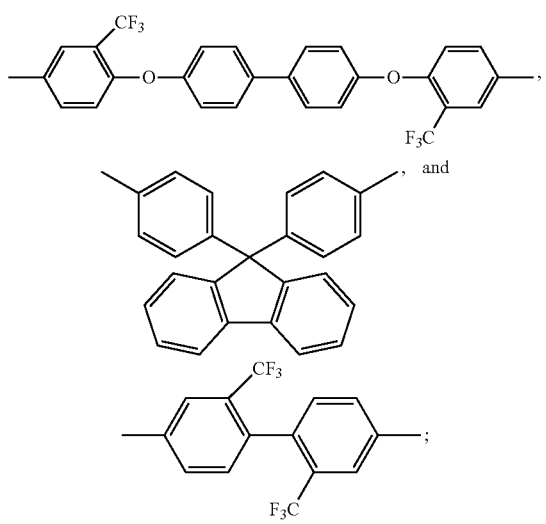

n is an integer selected from 1 to 5000, and m is an integer selected from: 1 to 5000.

The manufacturing method of the benzocyclobutene-containing polyimide resin includes the following procedures.

In a procedure A, a dehydration reaction is performed on C36 dimer diamine, aromatic diamine and aromatic dianhydride in a mixed solvent of a polar solvent and a low polar solvent to obtain a first solution containing a polyimide resin having an amine group at a terminal;

in a procedure B, 4-aminobenzocyclobutene is added to the first solution, so that the dehydration reaction is performed on 4-aminobenzocyclobutene and the polyimide resin having the amine group at the terminal to obtain a second solution containing a polyimide resin having benzocyclobutene at a terminal, and in a procedure C, an unreacted substance, a water-soluble substance and water in the second solution are removed to obtain the polyimide resin having benzocyclobutene at the terminal.

In an embodiment, in the procedure A, catalyst is not added in C36 dimer diamine, aromatic diamine and aromatic dianhydride in the mixed solvent of the polar solvent and the low polar solvent, and a dehydration amidation reaction is performed at 20° C. to 190° C. to obtain a first solution containing a polyimide resin having an anhydride group at a terminal. The low polar solvent herein includes toluene, xylene, mesitylene, methylcyclohexane, cyclohexane, or a combination thereof. The polar solvent herein includes methyl isopropyl ketone, methyl isopropyl ketone, cyclohexanone, diisobutyl ketone, methyl isobutyl ketone, 1,1,3-trimethylcyclohexenone, 2,6-dimethyl-2,5-heptadien-4-one, 2-pentanone, 3-methyl-2-pentanone, 2-methyl-3-pentanone, 3-pentanone, 4-methyl-3-penten-2-one, N-methyl-2-pyrrolidone, dimethylformamide, dimethylacetamide, or a combination thereof.

In an embodiment, in the procedure B, 4-aminobenzocyclobutene is added to the first solution, so that the dehydration reaction is performed on 4-aminobenzocyclobutene and the polyimide resin having the anhydride group at the terminal to obtain the second solution containing the polyimide resin having benzocyclobutene at the terminal. The dehydration reaction is that the dehydration amidation reaction is performed in the mixed solvent of the polar solvent and the low polar solvent at 100° C. to 190° C. to obtain a second solution containing a polyimide resin having a benzocyclobutene group at a terminal.

In an embodiment, the procedure C includes the following procedures. In a procedure C1, the second solution containing the polyimide resin having the benzocyclobutene at the terminal is washed with water, and a water layer is separated after setting aside to remove the unreacted substance and the water-soluble substance. In a procedure C2, a 1% aqueous hydrochloric acid solution is added for washing, and the water layer is separated after setting aside to remove an acid-soluble substance. In a procedure C3, deionized water is added for washing, and the water layer is separated after setting aside to remove a remaining acid substance, and in a procedure C4, the low-polar solvent is added for heating and refluxing to remove the water in the second solution, so as to obtain the polyimide resin containing the benzocyclobutene group.

In another embodiment, in the procedure C1, for example, the second solution containing the polyimide resin having the benzocyclobutene at the terminal is washed with low ion content water such as pure water, deionized water, and distilled water at 20° C. to 80° C. After stirring for 30 minutes, the water layer is separated and discarded after setting aside, and washing is repeated one to two times to remove the unreacted substance and a water-soluble polar solvent, so as to obtain the polyimide resin having the benzocyclobutene group at the terminal. In this way, a remaining water molecule and a small polar molecule in the polyimide resin having the benzocyclobutene group at the terminal after curing may be avoided affecting the dielectric loss of a cured product. In the procedure C2, the 1% aqueous hydrochloric acid solution is added to wash the second solution containing the polyimide resin having the benzocyclobutene at the terminal. After stirring for 30 minutes, the water layer is separated and discarded after setting aside, and washing is repeated one to two times to remove the unreacted substance and an acid-soluble substance. In the procedure C3, for example, the second solution containing the polyimide resin having the benzocyclobutene at the terminal is washed with the low ion content water such as the pure water, the deionized water, and the distilled water at 30° C. to 80° C. After stirring for 30 minutes, the water layer is separated and discarded after setting aside, and washing is repeated one to three times to remove remaining acid in the solution. In addition, in the procedure C4, for example, the solvent with a boiling point of 100° C. to 130° C., such as toluene, methylcyclohexane, cyclohexane is added, and the temperature is raised to 90° C. to 130° C. and refluxed to azeotropically remove the water in the second solution, so as to obtain the benzocyclobutene-containing polyimide resin.

The disclosure provides a benzocyclobutene-containing polyimide resin composition, which includes at least: (a) a filler, including hollow silica, a perfluoroalkoxy alkane resin, or a combination thereof, and
(b) a benzocyclobutene-containing polyimide resin, which has a chemical structure represented by Formula (1).

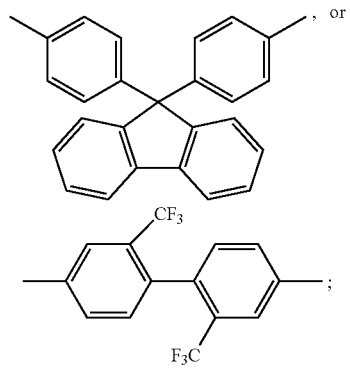

n is an integer selected from 1 to 5000, and m is an integer selected from 1 to 5000.

The disclosure provides a benzocyclobutene-containing polyimide resin composition, and a filler of the composition is hollow silica. A particle size may be from 10 nm to 5 μm, and the particle size is preferably 100 nm to 1 μm. A large particle size may cause an uneven surface of a film, while a small particle size may increase viscosity of a gum liquid. In fact, the particle size is preferably one-tenth or less of the film thickness. A hollow rate of hollow silica may be from 20% to 90%, and the hollow rate may be preferably from 60% to 80%. Since a dielectric constant of air is 1.0, the

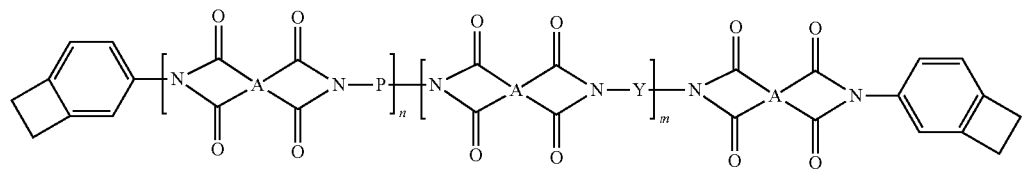

Formula (1)

P is a C36 divalent hydrocarbon group having an aliphatic side chain;

A is

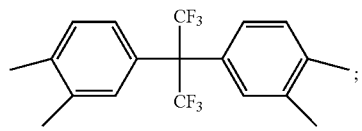

Y is

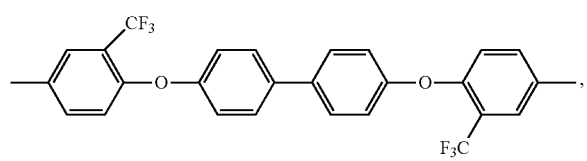

higher the hollow rate of silica, the lower the dielectric constant of particles. A shape of the particle size may be a sphere, cube, cuboid, cylinder, and an irregular shape, etc.

The disclosure provides a benzocyclobutene-containing polyimide resin composition, and a filler of the composition is a perfluoroalkoxy alkane resin (which is Fluon EA-2000 manufactured by AGC, and has a melting point of 298° C. and a particle size of 2 μm to 3 μm, abbreviated as PFA). PFA is a copolymer of tetrafluoroethylene ($C_2F_4$) and fluoroalkyl vinyl ether ($CF_2$—CF(ORf). A property of PFA is similar to that of polytetrafluoroethylene (PTFE), and the biggest difference from PTFE is that an alkoxy substituent generates a melting point. A molecular chain of PFA is shorter than that of PTFE, so that the molecular chain is not easily entangled. In addition, because of the presence of an alkoxy group, PFA is superior to PTFE in terms of transparency, fluidity, creep resistance and thermal stability. PFA has hydrophobicity, low dielectric constant, and low dielectric loss, and is blended and cured with the benzocyclobutene-containing polyamide resin. Therefore, the dielectric property is expected to be greatly reduced.

The disclosure provides a redistribution layer, which includes the benzocyclobutene-containing polyimide resin or the benzocyclobutene-containing polyimide resin composition as a constituent element, and a use of the redistribution layer is for manufacturing a semiconductor packaging material. A polyimide film includes the benzocyclobutene-containing polyimine resin or the benzocyclobutene-containing polyimine resin composition as a constituent element, and a use of the polyimide film is for manufacturing a semiconductor packaging material, a high-frequency substrate, or a printed circuit board.

In an embodiment, the gum liquid provided by the benzocyclobutene-containing polyimide resin or the benzocyclobutene-containing polyimide resin composition may be coated on a stainless steel plate, a glass plate, a copper foil, a polyethylene terephthalate (PET) film, and a polyimide (PI) film, etc. to form a semi-cured or cured polyimide film after drying or curing.

toluene is added and heated to 100° C. to 120° C. to azeotropically remove the water in a resin solution. After cooling, a solid content of the solution is adjusted to 30% with toluene to obtain a benzocyclobutene-containing polyimide resin solution PI-6F10BF, which has an acid value detected to be 0.002 and a weight average molecular weight measured to be 30,715 by GPC. In examples 1 to 3 and comparative example 1, a detection method of the acid value is to use 0.02N KOH as a titrant and methyl red as an indicator to titrate a test sample (a unit thereof is KOHmg/g). A molecular weight is measured by a gel permeation chromatography (GPC) method.

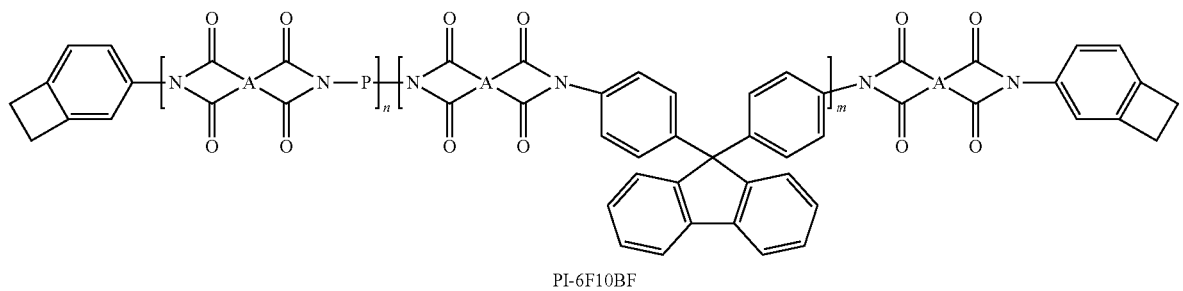

PI-6F10BF

Hereinafter, the disclosure will be described in detail with reference to embodiments. The following embodiments are provided to describe the disclosure, and the scope of the disclosure includes the following claims and the substitutions and modifications thereof. The disclosure is not limited to the scope of the embodiments.

Example 1

0.048 mol of C36 dimer diamine (trade name: Priamine 1074 Dimer diamine, manufactured by Croda Japan Ltd.), 0.050 mol of diamine BF (9,9-Bis(4-aminophenyl)fluorene, manufactured by Osaka Gas Chemical Co., Ltd., and a melting point of 240° C. to 241° C.), 0.1 mol dianhydride 6F ((Hexafluoroisopropylidene) diphthalic anhydride, manufactured by Sigma-Aldrich Co., Ltd., and purity of 99%), 80 g of N-methyl-2pyrrolidone, and 240 g of mesitylene are put into a four-neck reaction flask equipped with a mechanical stirrer, a drying tube, a distillation receiver and nitrogen. After a reaction temperature is controlled at 20° C. to 30° C. for 1 hour, the reaction temperature is raised to 100° C. to 120° C. for 1 hour and then heated to 170° C. to 190° C., so as to azeotropically remove water for 3 hours, and a first stage reaction is completed. Then the mixture is cooled to a temperature below 100° C., 0.004 mol of 4ABC (4-aminobenzocyclobutene/4-Aminobenzocyclobutene) is added and heated to 170° C. to 190° C. to azeotropically remove the water. After continuing the reaction for 2 hours, the temperature is lowered to 50° C., and then 200 g of pure water is added, and a mixture is stirred for 30 minutes at 50° C. A water layer is separated and removed after setting aside, and 200 g of 1% aqueous hydrochloric acid solution is added and stirred for 30 minutes at 50° C. Next, the water layer is separated and removed after setting aside, and then washing with the pure water is repeated three times, and 50 g of Example 2

0.048 mol of C36 dimer diamine (trade name: Priamine 1074 Dimer diamine, manufactured by Croda Japan Ltd.), 0.050 mol of diamine TF (manufactured by Sigma-Aldrich Co., Ltd., and purity of 99%), 0.1 mol dianhydride 6F ((Hexafluoroisopropylidene) diphthalic anhydride, manufactured by Sigma-Aldrich Co., Ltd., and purity of 99%), 80 g of N-methyl-2pyrrolidone, and 240 g of mesitylene are put into the four-neck reaction flask equipped with the mechanical stirrer, the drying tube, the distillation receiver and nitrogen. After a reaction temperature is controlled at 20° C. to 30° C. for 1 hour, the reaction temperature is raised to 100° C. to 120° C. for 1 hour and then heated to 170° C. to 190° C., so as to azeotropically remove water for 3 hours, and a first stage reaction is completed. Then the mixture is cooled to a temperature below 100° C., 0.004 mol of 4ABC is added and heated to 170° C. to 190° C. to azeotropically remove the water. After continuing the reaction for 2 hours, the temperature is lowered to 50° C., and then 200 g of pure water is added, and a mixture is stirred for 30 minutes at 50° C. A water layer is separated and removed after setting aside, and 200 g of 1% aqueous hydrochloric acid solution is added and stirred for 30 minutes at 50° C. Next, the water layer is separated and removed after setting aside, and then washing with the pure water is repeated three times, and 50 g of toluene is added and heated to 100° C. to 120° C. to azeotropically remove the water in a resin solution. After cooling, a solid content of the solution is adjusted to 30% with toluene to obtain a benzocyclobutene-containing polyimide resin solution PI-6F10TF, which has an acid value detected to be 0.002 and a weight average molecular weight measured to be 28,465 by GPC.

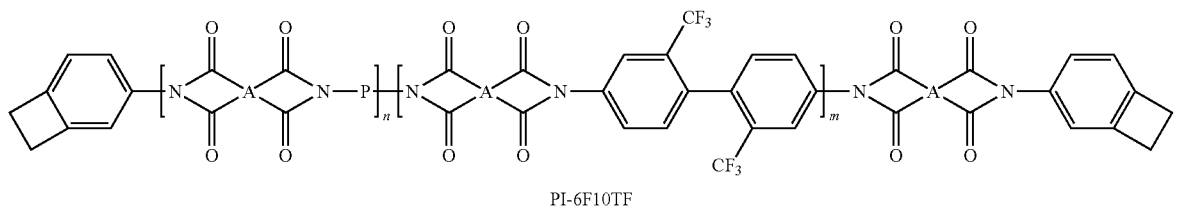

PI-6F10TF

Example 3

0.048 mol of C36 dimer diamine (trade name: Priamine 1074 Dimer diamine, manufactured by Croda Japan Ltd.), 0.050 mol of diamine BP (4,4-Bis(4-amino-2-trifluoromethyl phenoxy biphenyl, manufactured by TCI Chemical, and a melting point of 155° C. to 156° C.), 0.1 mol dianhydride 6F ((Hexafluoroisopropylidene) diphthalic anhydride, manufactured by Sigma-Aldrich Co., Ltd., and purity of 99%), 80 g of N-methyl-2pyrrolidone, and 240 g of mesitylene are put into the four-neck reaction flask equipped with the mechanical stirrer, the drying tube, a distillation receiver and nitrogen. After a reaction temperature is controlled at 20° C. to 30° C. for 1 hour, the reaction temperature is raised to 100° C. to 120° C. for 1 hour and then heated to 170° C. to 190° C., so as to azeotropically remove water for 3 hours, and a first stage reaction is completed. Then the mixture is cooled to a temperature below 100° C., 0.004 mol of 4ABC is added and heated to 170° C. to 190° C. to azeotropically remove the water. After continuing the reaction for 2 hours, the temperature is lowered to 50° C., and then 200 g of pure water is added, and a mixture is stirred for 30 minutes at 50° C. A water layer is separated and removed after setting aside, and 200 g of 1% aqueous hydrochloric acid solution is added and stirred for 30 minutes at 50° C. Next, the water layer is separated and removed after setting aside, and then washing with the pure water is repeated three times, and 50 g of toluene is added and heated to 100° C. to 120° C. to azeotropically remove the water in a resin solution. After cooling, a solid content of the solution is adjusted to 30% with toluene to obtain a benzocyclobutene-containing polyimide resin solution PI-6F10BP, which has an acid value detected to be 0.001, and a weight average molecular weight measured to be 31,290 by GPC.

raised to 160° C. to 180° C. to azeotropically remove the remaining water. The reaction temperature is lowered to 100° C., and a solid content is adjusted to 30% with toluene. A thermosetting polyimide resin solution PI-BP may be obtained, and an acid value thereof is detected, and a weight average molecular weight thereof is 34,230 measured by GPC.

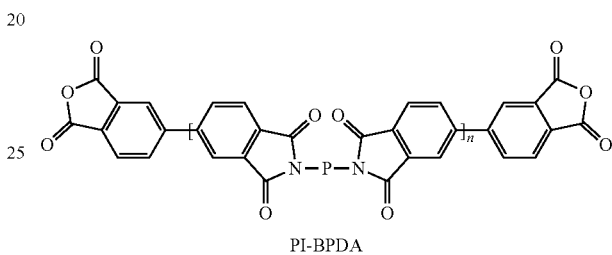

PI-BPDA

Examples 4 to 6

100 g of each of the resin solutions PI-6F10BF, PI-6F10TF, and PI-6F10BP in Examples 1 to 3 are sequentially dried for 2 hours at 120° C., 2 hours at 160° C., 2 hours at 180° C., 2 hours at 200° C., and finally baked for 2 hours at 250° C. to manufacture a cured product with a film thickness of 1.0 mm. The cured product is measured for a glass transition temperature, an elastic modulus, a thermal decomposition temperature, a dielectric constant (Dk), and a dielectric loss (Df) thereof. A gum liquid is coated on a heat-resistant glass plate and dried for 2 hours at 120° C., 2 hours at 160° C., 2 hours at 180° C., 2 hours at 200° C., and finally baked for 2 hours at 220° C. to obtain a cured product with a film thickness of 100 μm. The cured product is

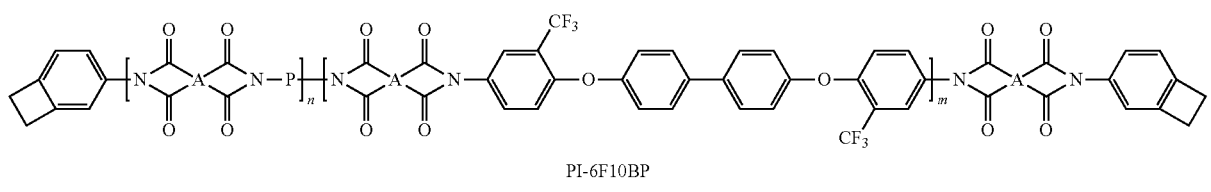

PI-6F10BP

Comparative Example 1

54.8 g (0.098 mole) of fatty amine dimer, 29.4 g (0.10 mole) of biphenyl dianhydride, 20 g of dimethylacetamide, and 200 g of diisobutyl ketone are put into a four-opening reaction flask equipped with a mechanical stirrer, a cooling tube, a drying tube, a distillation receiver and nitrogen, and a reaction temperature is controlled at 20° C. to 30° C., and to react for 1 hour. Next, the reaction temperature is raised to 125° C. to 135° C. to azeotropically remove water, and to react for 3 hours. Then, the reaction temperature is further detected for solvent resistance, film-forming property, and water absorption thereof, and data is shown as in Table 1.

Examples 7 to 8

100 g of each of the resin solutions PI-6F10TF and PI-6F10BP in Examples 2 to 3 are sequentially added to 15 g of hollow SiO2 (manufactured by CellSpheres/TAIHEIYO CEMENT company, and D50=3.6 μm), respectively, and mixed evenly to manufacture the gum liquid. The gum liquid is dried for 2 hours at 120° C., 2 hours at 160° C., 2 hours at 180° C., 2 hours at 200° C., and finally baked for 2 hours at 220° C. to manufacture the cured product with the film thickness of 1.0 mm. The cured product is measured for the glass transition temperature, the elastic modulus, the thermal decomposition temperature, the dielectric constant (Dk), and the dielectric loss (Df) thereof. The gum liquid is coated on the heat-resistant glass plate and dried for 2 hours at 120° C., 2 hours at 160° C., 2 hours at 180° C., 2 hours at 200° C., and finally baked for 2 hours at 220° C. to obtain the cured product with the film thickness of 100 μm. The cured product is detected for the solvent resistance, the film-forming property, and the water absorption thereof, and the data is shown as in Table 1.

Examples 9 to 10

100 g of each of the resin solutions PI-6F10TF and PI-6F10BP in Examples 2 to 3 are sequentially added to 15 g of PFA (which is perfluoroalkoxy alkane, Fluon EA-2000 manufactured by AGC, and has a melting point of 298° C.), respectively, and mixed evenly to manufacture the gum liquid. The gum liquid is dried for 2 hours at 120° C., 2 hours at 160° C., 2 hours at 180° C., 2 hours at 200° C., and finally baked for 2 hours at 220° C. to manufacture the cured product with the film thickness of 1.0 mm. The cured product is measured for the glass transition temperature, the elastic modulus, the thermal decomposition temperature, the dielectric constant (Dk), and the dielectric loss (Df) thereof. The gum liquid is coated on the heat-resistant glass plate and dried for 2 hours at 120° C., 2 hours at 160° C., 2 hours at 180° C., 2 hours at 200° C., and finally baked for 2 hours at 220° C. to obtain the cured product with the film thickness of 100 μm. The cured product is detected for the solvent resistance, the film-forming property, and the water absorption thereof, and the data is shown as in Table 1.

Comparative Example 2

100 g of the resin solution PI-BPDA in Comparative Example 1, 8 g of TGDDM (4,4'-diaminodiphenylmethane tetraglycidyl ether epoxy resin), and 0.03 g of TPP (triphenylphosphine) are mixed evenly to manufacture the gum liquid. The gum liquid is dried for 2 hours at 120° C., 2 hours at 160° C., 2 hours at 180° C., and finally baked for 2 hours at 250° C. to manufacture the cured product with the film thickness of 1.0 mm. The cured product is measured for the glass transition temperature, the elastic modulus, the thermal decomposition temperature, the dielectric constant (Dk), and the dielectric loss (Df) thereof. The gum liquid is coated on the heat-resistant glass plate and dried for 2 hours at 120° C., 2 hours at 160° C., 2 hours at 180° C., 2 hours at 200° C., and finally baked for 2 hours at 220° C. to obtain the cured product with the film thickness of 100 μm. The cured product is detected for the solvent resistance, the film-forming property, and the water absorption thereof, and the data is shown as in Table 1.

TABLE 1

| component/parts by weight | | Example 4 | Example 5 | Example 6 | Example 7 | Example 8 | Example 9 | Example 10 | Comparative Example 2 |
|---|---|---|---|---|---|---|---|---|---|
| resin | PI-6F10BF | 100 | — | — | — | — | — | — | — |
|  | PI-6F10TF | — | 100 | — | 100 | — | 100 | — | — |
|  | PI-6F10BP | — | — | 100 | — | 100 | — | 100 | — |
|  | PI-BPDA | — | — | — | — | — | — | — | 100 |
|  | hollow $SiO_2$ | — | — | — | 15 | 15 | — | — | — |
|  | PFA | — | — | — | — | — | 15 | 15 | — |
|  | TGDDM | — | — | — | — | — | — | — | 8 |
|  | TPP | — | — | — | — | — | — | — | 0.03 |
| evaluation results | Tg/° C. | 264 | 218 | 220 | 203 | 231 | 186 | 207 | 46 |
|  | Td3/° C. | 417 | 413 | 414 | 418 | 419 | 402 | 409 | 407 |
|  | Td5/° C. | 429 | 425 | 428 | 435 | 434 | 425 | 430 | 430 |
|  | Dk | 2.39 | 2.41 | 2.49 | 1.71 | 1.65 | 2.25 | 2.22 | 2.29 |
|  | Df | 0.0026 | 0.0019 | 0.0017 | 0.0023 | 0.0027 | 0.0010 | 0.0013 | 0.0036 |
|  | elastic modulus/GPa | 2.0 | 1.7 | 1.5 | 1.1 | 1.1 | 0.9 | 1.2 | 0.4 |
|  | water absorption/% | 0.32 | 0.23 | 0.19 | 0.21 | 0.18 | 0.13 | 0.11 | 0.37 |
|  | solvent resistance | ○ | ○ | ○ | ○ | ○ | ○ | ○ | x |
|  | film-forming property | ○ | ○ | ○ | ○ | ○ | ○ | ○ | ○ |

The glass transition temperature (Tg): A maximum peak temperature is measured by a dynamic mechanical analyzer (DMA) that is manufactured by TA Instruments, and a unit is ° C.

The elastic modulus: A storage modulus is measured by the DMA that is manufactured by TA Instruments, and a unit is GPa.

The thermal decomposition temperature (Td3/Td5): it is measured by a Q500 thermogravimetric analyzer (TGA) that is manufactured by TA Instruments. The result is represented by the thermal decomposition temperature of 5% thermal weight loss, and the unit is ° C.

The dielectric constant (Dk): it is measured at a frequency of 10 GHz by a resonant cavity that is manufactured by AGILENT Technologies, Inc.

The dielectric loss (Df): it is measured at a frequency of 5 GHz by the resonant cavity that is manufactured by AGILENT Technologies, Inc.

The water absorption: According to IPC-TM-650 2.6.2.1 method, a 50.8 mm×50.8 mm film is dried for one hour at 120° C. and then immersed in distilled water for 24 hours at 23° C. Surface water is wiped off, and an increase in weight of the film is measured and represented by a percentage.

The film-forming property: After the gum liquid is coated on the glass plate, the gum liquid is dried and cured, and an appearance thereof is checked.

○: The surface is flat.
Δ: The surface is rough and uneven.
x: The film is cracked.

The solvent resistance: The film is soaked in methyl ethyl ketone (MEK) for 1 hour and an appearance thereof is checked.

○: The film is not changed.
Δ: The film swells.
x: The film is cracked and dissolved.

Based on the above, it is clear from Table 1 that the cured products of PI-6F10BF, PI-6F10TF, and PI-6F10BP in Examples 4 to 6 have much higher glass transition temperature, which is Tg=218° C. to 264° C., than that of the cured product of PI-BPDA in Comparative Example 2, which is Tg=46° C. In terms of the thermal decomposition temperature (Td3), the cured products of PI-6F10BF, PI-6F10TF, and PI-6F10BP also have higher temperature, which is Td3=413 to 417° C., than that of the cured product of PI-BPDA, which is Td3=407° C. The overall heat resistance of PI-6F10BF, PI-6F10TF, and PI-6F10BP is better than PI-BPDA.

In terms of the dielectric loss (Df), the dielectric loss of the cured products of PI-6F10BF, PI-6F10TF, PI-6F10BP, which is Df=0.0017 to 0.0026, is lower than that of the cured product of PI-BPDA, which is Df=0.0036. In terms of the elastic modulus, PI-6F10BF, PI-6F10TF, and PI-6F10BP are able to maintain a low elastic modulus of 2.0 GPa or less.

In terms of the water absorption, the water absorption of the cured products of PI-6F10BF, PI-6F10TF, and PI-6F10BP, which is Df=0.001, is lower than that of the cured product of PI-BPDA. In terms of the solvent resistance, the cured products of PI-6F10BF, PI-6F10TF, and PI-6F10BP are better than the cured product of PI-BPDA, and PI-6F10BF, PI-6F10TF, and PI-6F10BP may also have good film-forming property.

Based on each performance evaluation, the resins PI-6F10BF, PI-6F10TF, PI-6F10BP have high heat resistance, low dielectric loss, low elastic modulus, solvent solubility such as toluene, low water absorption, solvent resistance, and good film-forming property, which are better than the resin PI-BPDA in the prior art, and thus may meet requirements of an isolation polymer such as the redistribution layer and the polyimide film for semiconductor packaging in the high-speed and high-frequency field.

In order to further reduce the dielectric property, the resins PI-6F10TF and PI-6F10BP with lower dielectric loss are selected to be blended and cured with hollow SiO2 or the perfluoroalkoxy alkane resin (PFA). The result show that after adding 50 phr of hollow SiO2, the dielectric constant may be reduced to Dk=1.65~1.71, and that after adding 50 phr of the perfluoroalkoxy alkane resin (PFA), the dielectric loss may also be reduced to Df=0.0010 to 0.0013. The excellent low dielectric property and other originally maintained characteristics such as the heat resistance, which are better than the resin PI-BPDA in the prior art, may thus meet the requirements of the isolation polymer such as the redistribution layer and the polyimide film for semiconductor packaging in the high-speed and high-frequency field.

The disclosure has been described in detail with the above embodiments and comparative examples. Those skilled in the art may be able to make various variations based on the above descriptions, and thus the claims of the disclosure are not limited thereto.

What is claimed is:

1. A benzocyclobutene-containing polyimide resin, having a chemical structure represented by Formula (1),

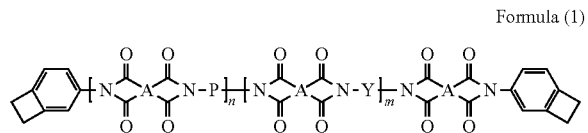

Formula (1)

wherein P is a C36 divalent hydrocarbon group having an aliphatic side chain,
A is

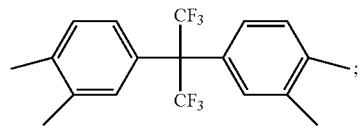

Y is one or more selected from a group consisting of

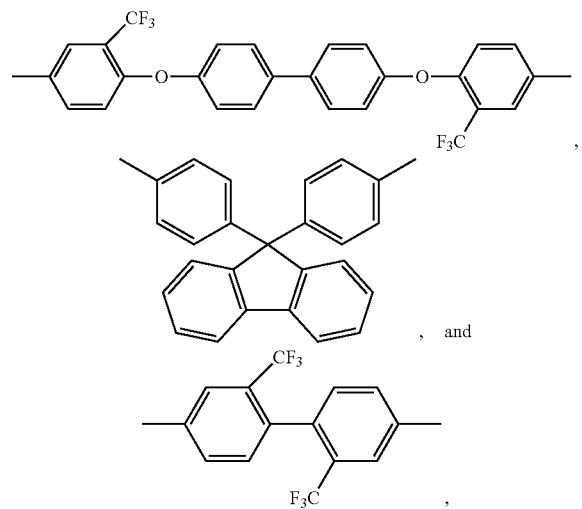

, and

, n is an integer selected from 1 to 5000, and m is an integer selected from 1 to 5000.

2. A manufacturing method of a benzocyclobutene-containing polyimide resin, having a chemical structure represented by Formula (1),

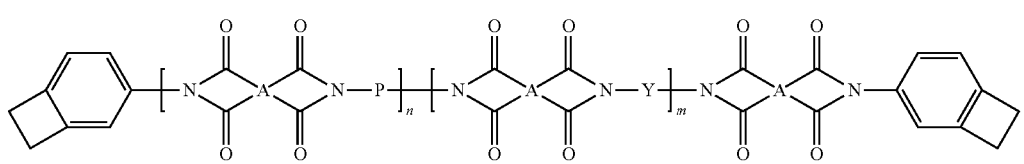

Formula (1)

wherein P is a C36 divalent hydrocarbon group having an aliphatic side chain,
A is

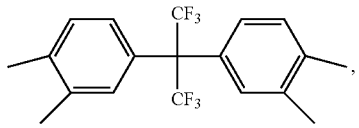,

Y is one or more selected form a group consisting of

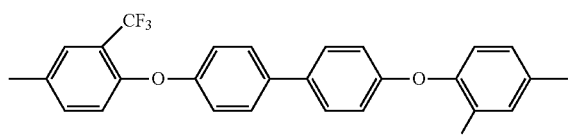,

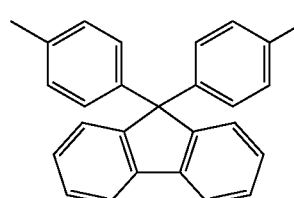, and

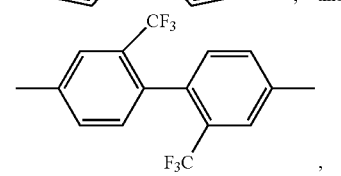, n is an integer selected from 1 to 5000, and m is an integer selected from: 1 to 5000, and wherein the manufacturing method of the benzocyclobutene-containing polyimide resin comprises:
in a procedure A, performing a dehydration reaction on C36 dimer diamine, aromatic diamine and aromatic dianhydride in a mixed solvent of a polar solvent and a low polar solvent to obtain a first solution containing a polyimide resin having an amine group at a terminal,
in a procedure B, adding 4-aminobenzocyclobutene to the first solution, to perform the dehydration reaction on 4-aminobenzocyclobutene and the polyimide resin having the amine group at the terminal to obtain a second solution containing a polyimide resin having benzocyclobutene at a terminal, and
in a procedure C, removing an unreacted substance, a water-soluble substance and water in the second solution to obtain the polyimide resin having benzocyclobutene at the terminal.

3. A benzocyclobutene-containing polyimide resin composition, comprising at least: (a) a filler, comprising hollow silica, a perfluoroalkoxy alkane resin, or a combination thereof; and (b) a benzocyclobutene-containing polyimide resin, having a chemical structure represented by Formula (1), Formula (1)

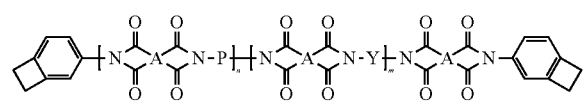

wherein P is a C36 divalent hydrocarbon group having an aliphatic side chain,
A is

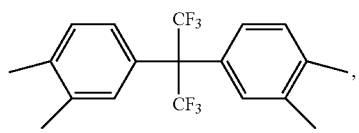,

Y is

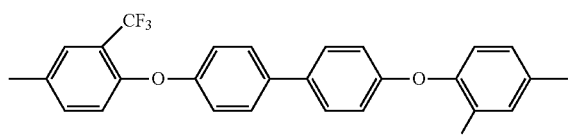,

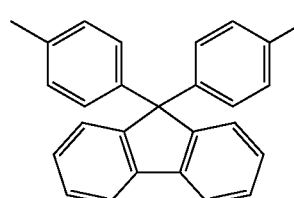, or

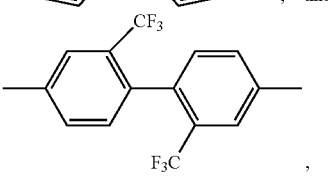, n is an integer selected from 1 to 5000, and m is an integer selected from 1 to 5000.

4. A redistribution layer, comprising the benzocyclobutene-containing polyimide resin according to claim 1 as a constituent element.

5. A redistribution layer, comprising the benzocyclobutene-containing polyimide resin composition according to claim 3 as a constituent element.

6. A polyimide film, comprising the benzocyclobutene-containing polyimide resin according to claim 1 as a constituent element.

7. A polyimide film, comprising the benzocyclobutene-containing polyimide resin composition according to claim 3 as a constituent element.

8. A semiconductor packaging material, comprising the redistribution layer according to claim 4.

9. A semiconductor packaging material, comprising the redistribution layer according to claim 5.

10. A semiconductor packaging material, comprising the polyimide film according to claim 6.

11. A semiconductor packaging material, comprising the polyimide film according to claim 7.

12. A high-frequency substrate, comprising the polyimide film according to claim 6.

13. A printed circuit board, comprising the polyimide film according to claim 6.

14. A high-frequency substrate, comprising the polyimide film according to claim 7.

15. A printed circuit board, comprising the polyimide film according to claim 7.

* * * * *